US 9,468,944 B2

(12) United States Patent
Andreae et al.

(10) Patent No.: US 9,468,944 B2
(45) Date of Patent: Oct. 18, 2016

(54) SYSTEM AND METHOD WITH MULTI-AXIS TILTING

(71) Applicant: SST Systems, Inc., Sturgeon Bay, WI (US)

(72) Inventors: Chad Martin Andreae, Sturgeon Bay, WI (US); Bradley M. Andreae, Sturgeon Bay, WI (US); Bradley S. Andreae, Sturgeon Bay, WI (US)

(73) Assignee: SST Systems, Inc., Sturgeon Bay, WI (US)

( * ) Notice: Subject to any disclaimer, the term of this patent is extended or adjusted under 35 U.S.C. 154(b) by 215 days.

(21) Appl. No.: 14/281,229

(22) Filed: May 19, 2014

(65) Prior Publication Data
US 2014/0342092 A1 Nov. 20, 2014

Related U.S. Application Data

(60) Provisional application No. 61/824,840, filed on May 17, 2013.

(51) Int. Cl.
*B05C 3/02* (2006.01)
*B05C 3/10* (2006.01)
*B05D 1/18* (2006.01)
*B65G 49/00* (2006.01)
*B65G 49/04* (2006.01)
*C25D 17/06* (2006.01)
*C25D 13/22* (2006.01)

(52) U.S. Cl.
CPC . *B05C 3/10* (2013.01); *B05C 3/02* (2013.01); *B65G 49/04* (2013.01); *B65G 49/0413* (2013.01); *B65G 49/0459* (2013.01); *B65G 49/0463* (2013.01); *B05D 1/18* (2013.01); *C25D 13/22* (2013.01); *C25D 17/06* (2013.01)

(58) Field of Classification Search
None
See application file for complete search history.

(56) References Cited

U.S. PATENT DOCUMENTS

| 2,707,053 | A |   | 4/1955  | Browning        |            |
|-----------|---|---|---------|-----------------|------------|
| 3,567,040 | A |   | 3/1971  | Thomson         |            |
| 4,192,331 | A |   | 3/1980  | Koering         |            |
| 4,286,722 | A |   | 9/1981  | Tax et al.      |            |
| 4,812,211 | A | * | 3/1989  | Sakai           | C25D 13/22 |
|           |   |   |         |                 | 118/425    |
| 4,883,184 | A | * | 11/1989 | Albus           | B66C 13/08 |
|           |   |   |         |                 | 212/195    |
| 5,151,006 | A |   | 9/1992  | Marttila et al. |            |
| 5,257,891 | A |   | 11/1993 | Baumann et al.  |            |
| 5,765,703 | A | * | 6/1998  | Shiwaku         | B66C 13/08 |
|           |   |   |         |                 | 212/274    |

(Continued)

OTHER PUBLICATIONS

"Moving Basket Electrodeposition Coating Plant" product description page dated Oct. 28, 2011, believed to be of Tae Kwang General Machine Co., Ltd.

*Primary Examiner* — Binu Thomas
(74) *Attorney, Agent, or Firm* — Michael Best & Friedrich LLP

(57) ABSTRACT

A system includes a plurality of stations positioned along a direction of conveyance. Rails span the length of all stations and include at least first, second, and third rails configured for independent vertical movement. A plurality of objects is supported by and movable along the first, second, and third rails between the stations. Each of the plurality of objects has first, second, and third supports coupled to the respective first, second, and third rails so that all of the plurality of objects tilt in unison about a first set of parallel axes in response to the first, second, and third rails being positioned in a first configuration of vertical heights, and all of the plurality of objects tilt in unison about a second set of parallel axes in response to the first, second, and third rails being positioned in a second configuration of vertical heights.

22 Claims, 17 Drawing Sheets

(56) References Cited

U.S. PATENT DOCUMENTS

| | | |
|---|---|---|
| 6,126,023 A | 10/2000 | Durrant-Whyte et al. |
| 7,287,740 B2 | 10/2007 | Reyes et al. |
| 2004/0149542 A1* | 8/2004 | Kyotani ............. B65G 49/0463 198/375 |
| 2008/0093322 A1 | 4/2008 | Ehrenleitner |
| 2008/0121601 A1* | 5/2008 | Ehrenleitner ............. B66C 1/20 212/76 |
| 2011/0017132 A1 | 1/2011 | Robbin |
| 2013/0264302 A1* | 10/2013 | Andreae ................ B66C 19/00 212/71 |

* cited by examiner

SYSTEM AND METHOD WITH MULTI-AXIS TILTING

CROSS-REFERENCE TO RELATED APPLICATIONS

This application is a non-provisional of and claims priority to U.S. Provisional Patent Application No. 61/824,840, filed May 17, 2013, the entire contents of which are hereby incorporated by reference.

BACKGROUND

The present invention relates to systems, for example coating systems, for industrial processing of batches of components. Although machines for coating systems can carry, rotate, and/or change the inclination of elements dipped into a container, independent control of individual fixtures is generally required, at the expense of cost and complexity. Systems for processing batches of parts at a single time are available, but are generally limited to tilting parts about a single axis.

SUMMARY

In one aspect, the invention provides a system including a plurality of stations positioned along a direction of conveyance. A set of rails span across a length of the plurality of stations and include at least first, second, and third rails configured for independent vertical movement. A plurality of objects is supported by and movable along the first, second, and third rails relative to the plurality of stations so that each of the plurality of objects can be positioned at a corresponding one of the stations. Each of the plurality of objects has first, second, and third supports coupled to the respective first, second, and third rails so that all of the plurality of objects tilt in unison about a first set of parallel axes in response to the first, second, and third rails being positioned in a first configuration of relative vertical heights, and all of the plurality of objects tilt in unison about a second set of parallel axes in response to the first, second, and third rails being positioned in a second configuration of relative vertical heights.

In another aspect, the invention provides a method of processing a plurality of objects through a plurality of stations of a system. First, second, and third rails extend along a length of the plurality of stations in a direction of conveyance, and each one of the plurality of objects is suspended from the first, second, and third rails with individual support members. Every one of the plurality of objects is tilted in unison in a first direction about a first set of parallel axes in response to the first, second, and third rails being positioned in a first configuration of relative vertical heights. Every one of the plurality of objects is tilted in unison in a first direction about a second set of parallel axes in response to the first, second, and third rails being positioned in a second configuration of relative vertical heights.

Other aspects of the invention will become apparent by consideration of the detailed description and accompanying drawings.

DETAILED DESCRIPTION

Figure 1:
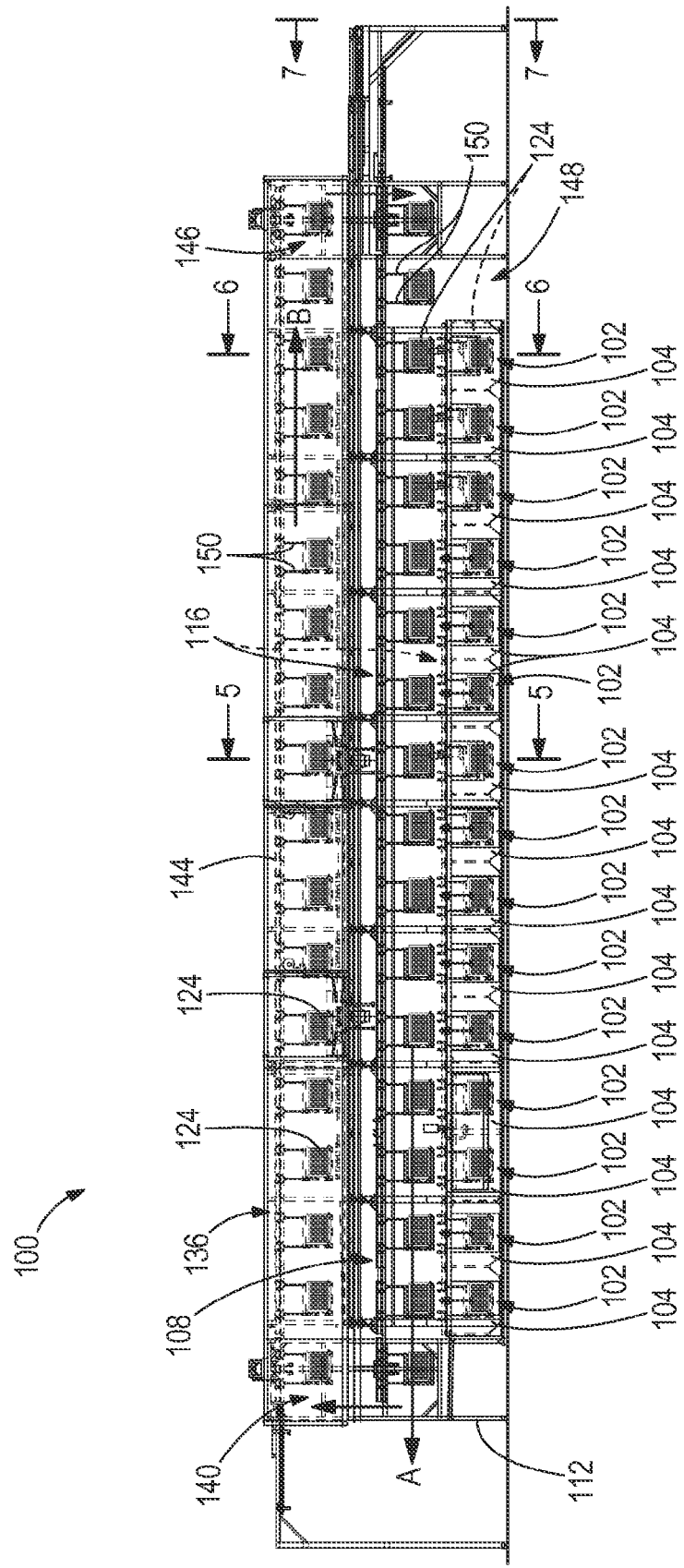
FIG. 1 is a side elevation view of a coating system according to one aspect of the invention.
Figure 2:
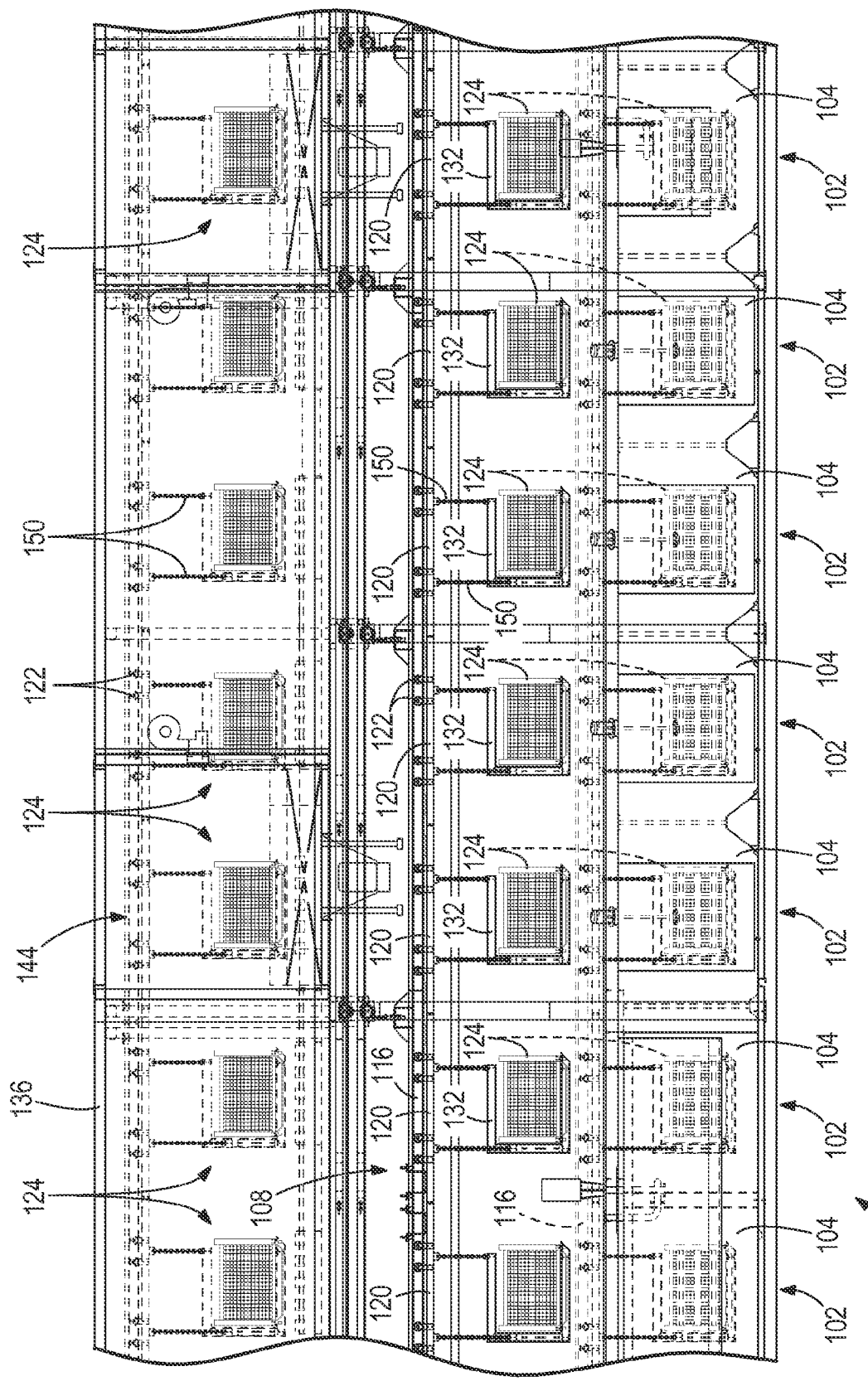
FIG. 2 is a detail view of a portion of the coating system shown in FIG. 1.
Figure 3:
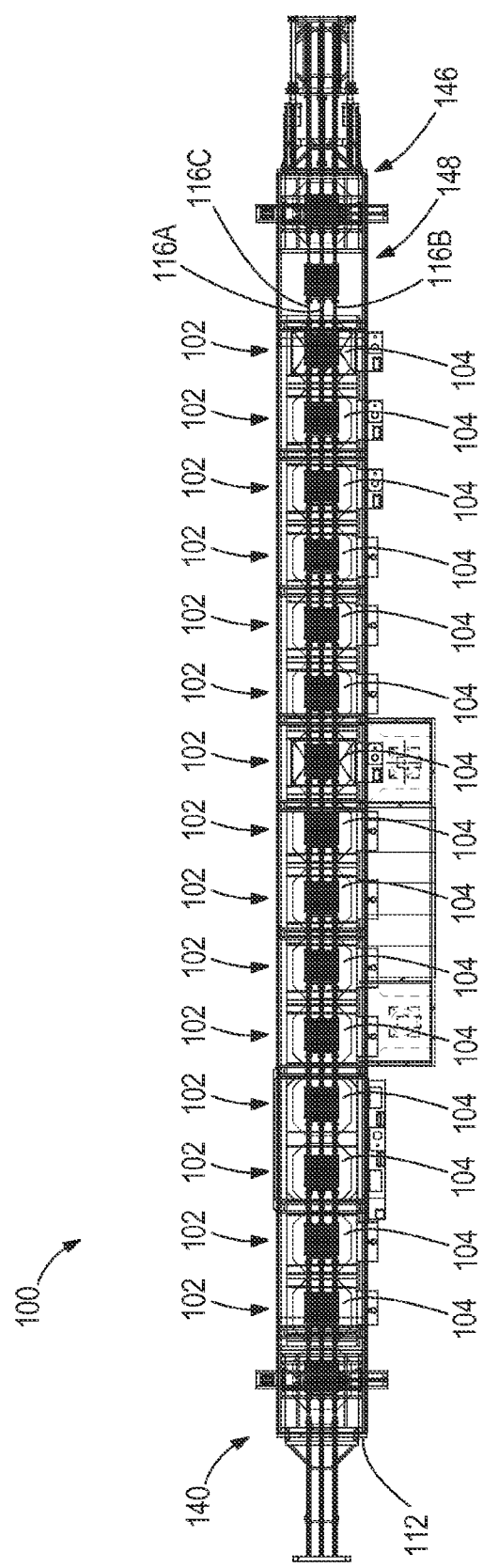
FIG. 3 is a top view of the coating system of FIG. 1.
Figure 4:
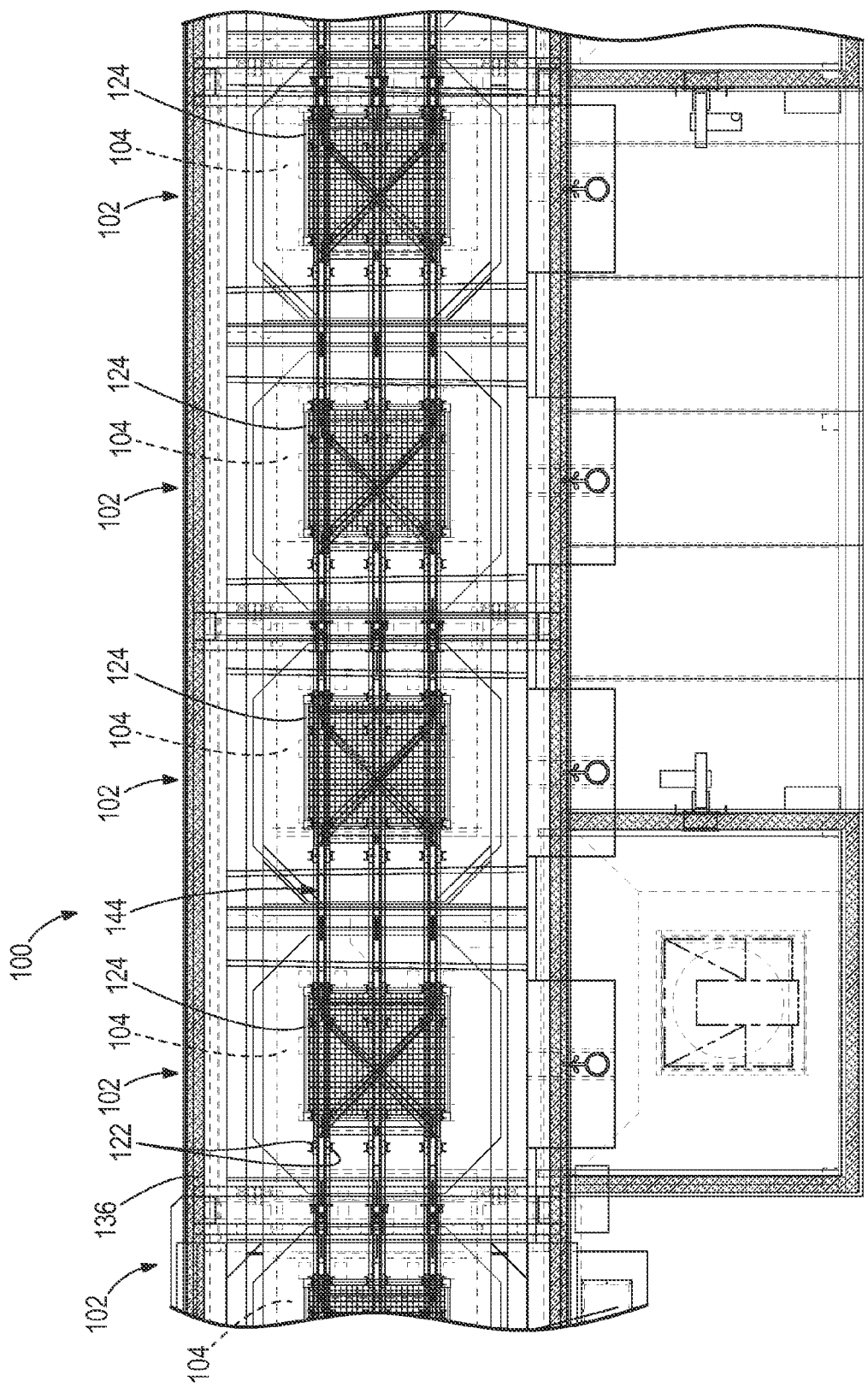
FIG. 4 is a detail view of a portion of the coating system shown in FIG. 3.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

A system 100 is provided for performing one or more processes on a plurality of work pieces (e.g., unfinished manufactured items). In some constructions, the system 100 is a finishing system for applying a finish to a work piece, which may be otherwise completed, fully formed and/or manufactured. Although further description and reference to the drawings may refer to a finishing system, aspects of the invention may not be limited to finishing systems. The finishing system 100 includes a series of sequential finishing stations 102 through which parts are processed. The finishing system 100 can be a coating system (e.g., e-coating) with a series of coating stations 102 configured to apply a surface coating of paint by immersing the parts into tanks 104 corresponding to the coating stations 102. Each tank 104 contains a volume of liquid associated with a coating process. Depending upon the type of coating, the liquid in the tanks 104 and the parts to be coated may be oppositely electrically charged to promote adhesion.

However, the finishing system 100 is not limited to such an example, and can include one or more of electrocoating, autodeposition coating, power coating, liquid spray painting, cleaning, pre-treatment, and heat treating operations. As mentioned above, the system 100 need not even be a finishing system in some construction, and thus, can include stations for sequentially processing or performing steps on work pieces that relate to processes other than coating or applying a finish.

A conveyor system 108 runs along and above the tanks 104, which are arranged in a row, to define a direction of conveyance A. The conveyor system 108 includes a stationary support frame 112, a plurality of rails 116 supported by the support frame 112, and a plurality of carriages 120 supported by the rails 116. The carriages 120 are movable along the rails 116 in the direction of conveyance A. In some constructions, each carriage 120 is configured as a push tube, or a rectangular tube with rollers 122, slidable along the corresponding rail 116 in the manner of a sliderail square transfer system (SST™ System developed by Therma-Tron-X, Inc.). For example, each of the rails 116 can have an "I" shaped cross-section, defining two tracks, one on each side. However, movement of the push tubes 120, or other types of carriages, along the rails 116 can be provided by alternate structures in other constructions (e.g., rollers within channels from which bars or frames are suspended for movement along the channels, and the like). Each of the push tubes 120 has a length corresponding to a length of one of the coating stations 102, and each push tube 120 has ends that abut the adjacent push tubes 120 so that movement of an upstream one of the push tubes 120 causes movement of all of the downstream push tubes 120. Movement of all of the push tubes 120 along the rails 116 is driven by a pusher mechanism (e.g., hydraulic cylinder) that engages the most upstream set of push tubes 120 and strokes forward by a distance equal to the length of a station 102 and the length of one set of push tubes 120. The number of push tubes 120 at a given location along the plurality or rails 116 corresponds to the number of rails 116. For example, in the illustrated construction, there are three rails including a first, central rail 116A and a pair of second and third rails 116B, 116C that laterally flank the central rail 116A, and there is a set of three push tubes 120 provided at each coating station 102 at any given time, one coupled to each of the individual rails 116. As described in further detail below, each of the rails 116 is movable vertically, independently of the other rails 116. In some embodiments (e.g., the illustrated embodiment) the three rails 116A, 116B, 116C are all parallel to one another, although in other embodiments this is not necessarily the case.

Although the particular push tube conveyance system is described herein for moving carriages 120 to different stations 102 along the system 108, it will be appreciated that the carriages 120 can be pushed, pulled, or otherwise moved to different positions along the rails 116 in any other manner and by using other motive force. By way of example only, each carriage 120 can have individual motors or other prime movers to move the carriages 120 collectively or individually (i.e., independently) along the rails 116. As another example, the carriages 120 can be pulled and/or pushed by cables, chains, belts, or other elongated members extending along the rails 116, connected to each carriage 120, and movable by a suitable motor or other drive system. However, the push tube conveyance system disclosed herein has particular advantages over a number of other systems in its simplicity and adaptability to easily connect and interface with upstream and downstream conveyor systems.

A single object 124 is carried by the set of push tubes 120 located at each common position or station 102 along the rails 116. As used herein, an object or item can be a part or "work piece" for coating or, alternately, a fixture, container, bin, basket, etc. used for holding one or a plurality of parts for coating. Regardless of whether the object 124 is a part for coating or another structure configured to carry one, two, or more parts, the object 124 has a number of supports 128 thereon (best shown in FIGS. 5-11), all of which can be maintained in fixed distance relation to each other, The number of supports 128 corresponds to the number of rails 116—three in the illustrated construction. As illustrated, the object 124 supported by each set of push tubes 120 is a liquid permeable (e.g., open wire mesh) container or basket configured to hold one or more loose parts therein. Although much of the description below presents this construction in detail, it will be appreciated that wherever the baskets 124 are referenced, the description can be applied to different containers or fixtures or to a work piece directly. Each basket 124 includes a carrier frame 132 (e.g., a C-shaped upper frame constructed of steel) on which the first, second, and third supports 128A, 128B, 128C are provided. It will be appreciated that the supports 128A, 128B, 128C can be parts of a single element or device (e.g., a frame) or can be different elements of the basket. Each basket 124 is suspended from the corresponding set of push tubes 120 with a support member 150 extending between each push tube 120 and the corresponding support 128 on the carrier frame 132. The support members 150 can be non-rigid components, such as chains, cables, straps, cords, or the like. Alternatively, the support members 150 can be rigid or semi-rigid members provided with pivoting connections at the push tube 120 and at the support 128 on the basket 124 to enable tilting of the basket 124 in multiple directions. The illustrated support members 150 secure fixed-length connections between the push tubes 120 and the respective supports 128.

Figure 5:
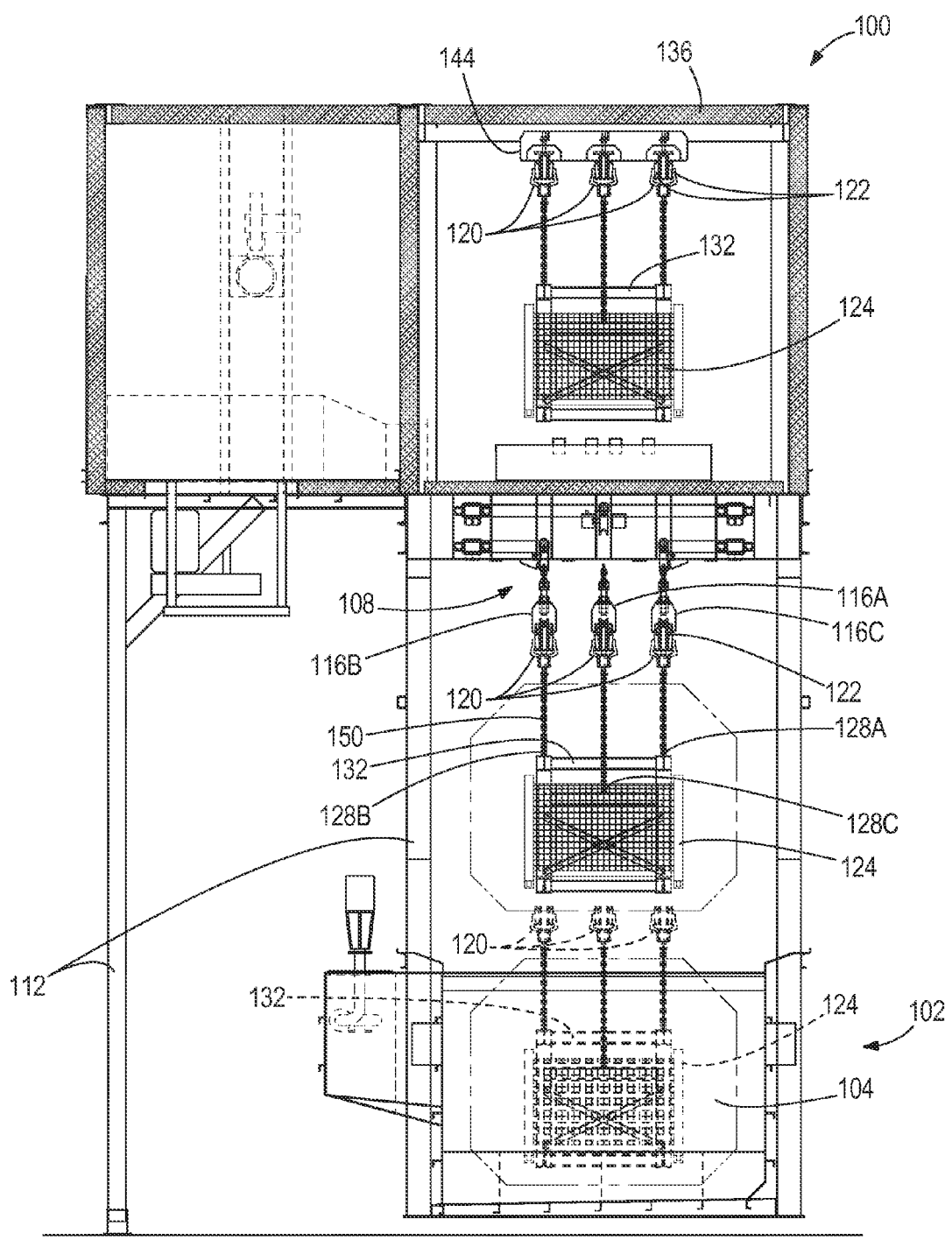
FIG. 5 is a cross-sectional view, taken along line 5-5 of FIG. 1.
Figure 6:
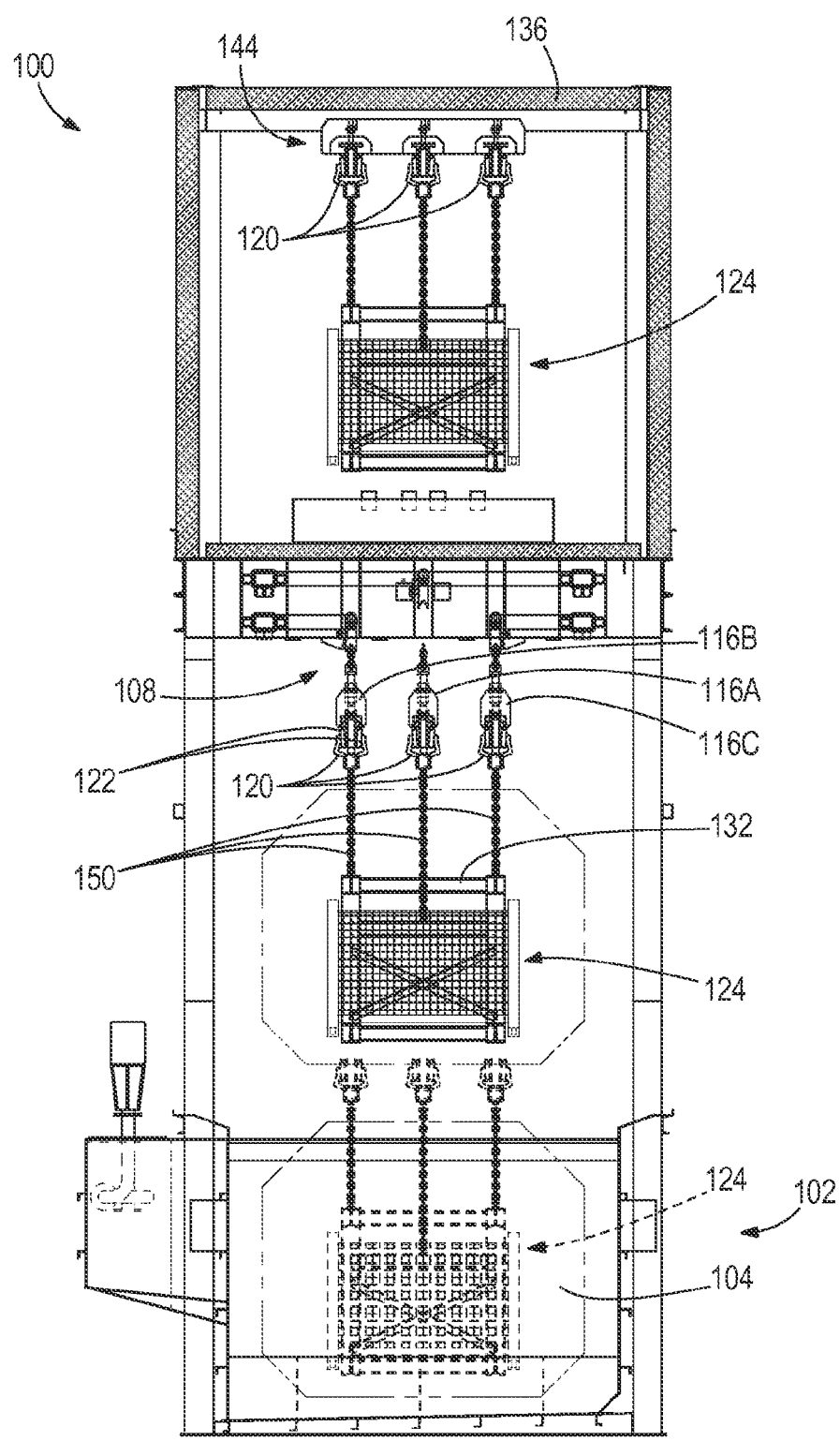
FIG. 6 is a cross-sectional view, taken along line 6-6 of FIG. 1.
Figure 7:
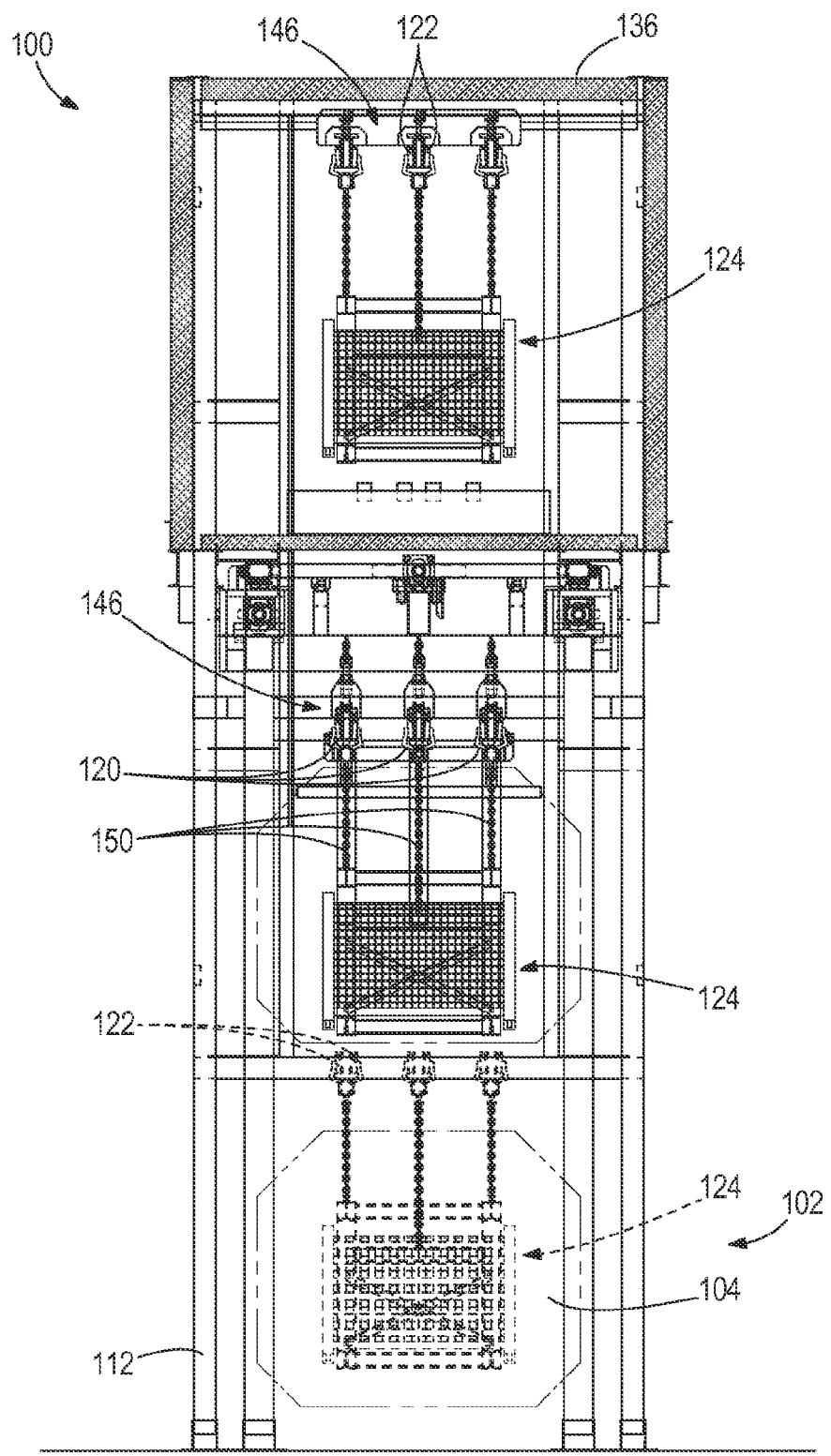
FIG. 7 is a cross-sectional view, taken along line 7-7 of FIG. 1.

In the illustrated construction, the first support 128A is located centrally along a lateral direction transverse to the direction of conveyance A. The second and third supports 128B, 128C are side supports spaced laterally to opposite sides of the first support 128A. In the illustrated construction, the first support 128A is positioned at a lower vertical height than the second and third supports 128B, 128C as shown in FIG. 5. The rails 116 and baskets 124 are shown in both their uppermost and lowermost positions to illustrate the maximum and minimum vertical positions of the baskets 124 with respect to the tanks 104. In some embodiments, only one basket 124 is present at each coating station 102 at a given time. The baskets 124 can be positioned entirely above the tanks 104 at maximum height and can be entirely submerged in the liquid of the tanks 104 at minimum height. Because all of the baskets 124 are supported by the same three rails 116 that extend over all of the stations 102, all of the baskets 124 are raised and lowered concurrently when the rails 116 are raised and lowered.

In addition to the rails 116 that are positioned directly over the tanks 104 to convey and manipulate the orientation of the baskets 124, the illustrated finishing system 100 includes an oven 136 positioned entirely above the rails 116 and the coating stations 102 and extending substantially the same length as the rails 116. Other finishing systems 100 need not include an oven 136. A vertical transfer conveyor 140 adjacent the downstream ends of the rails 116 receives and lifts the push tubes 120 and each corresponding basket 124 to the oven 136 during indexing of the baskets 124 through the finishing process. The vertical transfer conveyor 140 can include rails having a similar shape and size to the rails 116. However, the rails of the vertical transfer conveyor 140 may be rigidly coupled together and configured to move vertically in unison, rather than independently. A hydraulic cylinder and chains, or an alternate drive mechanism, is provided to lift the push tubes 120 and the corresponding basket 124 at the vertical transfer conveyor 140, independently of the manipulation of the rails 116 and the baskets 124 positioned at the coating stations 102. In the illustrated system 100, a return conveyor 144 (e.g., SST™ type) pushes the push tubes 120 through the oven 136 back toward the upstream end of the first conveyor system 108, in a direction of conveyance B. Movement of all of the push tubes 120 along the rails of the return conveyor 144 is driven by a pusher mechanism (e.g., hydraulic cylinder or any of the other alternative structures described above) that engages the most upstream set of push tubes 120 and strokes forward by a distance equal to the length of one set of push tubes 120. With continued reference to the illustrated embodiment by way of example only, a second vertical transfer conveyor 146 at the upstream end of the first conveyor system 108 receives the push tubes 120 from the return conveyor 144 and lowers the push tubes 120 and the corresponding basket 124 out of the oven 136. The second vertical transfer conveyor 146 can be constructed similarly to the first vertical transfer conveyor 140, described above. After exiting the oven 136 and returning to the lower level, the push tubes 120 and the corresponding basket 124 are indexed laterally to a loading and unloading station 148. The loading and unloading station 148 can include a roller conveyor or other device for indexing a finished load out of the system 100 and indexing a new, unfinished load into the system 100.

Figure 9:
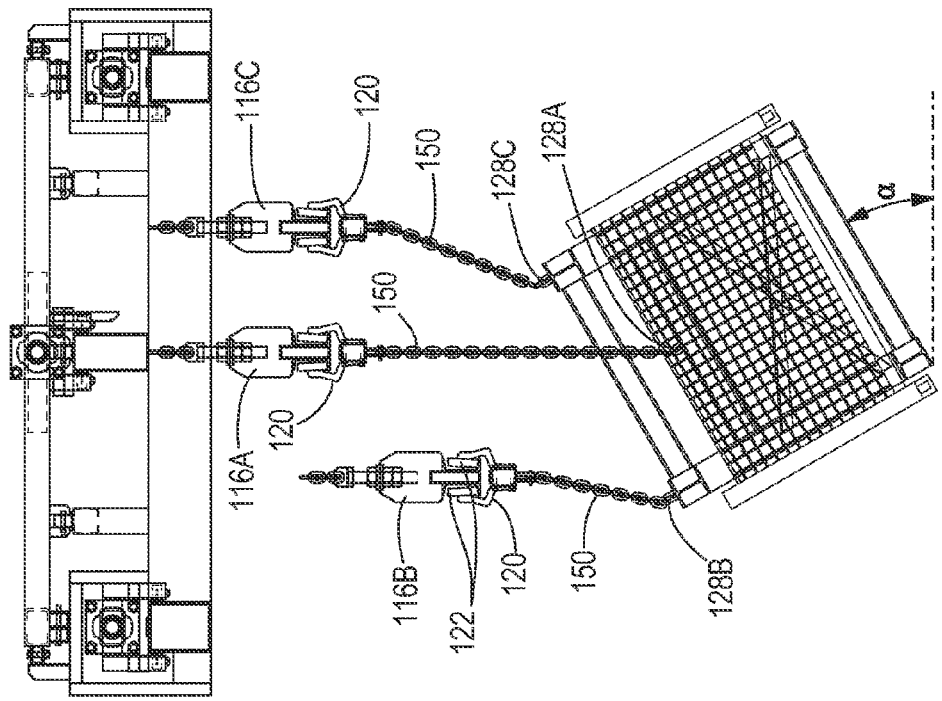
FIG. 9 is an end view of an object suspended from three rails of the coating system and tilted in a second lateral direction.
Figure 8:
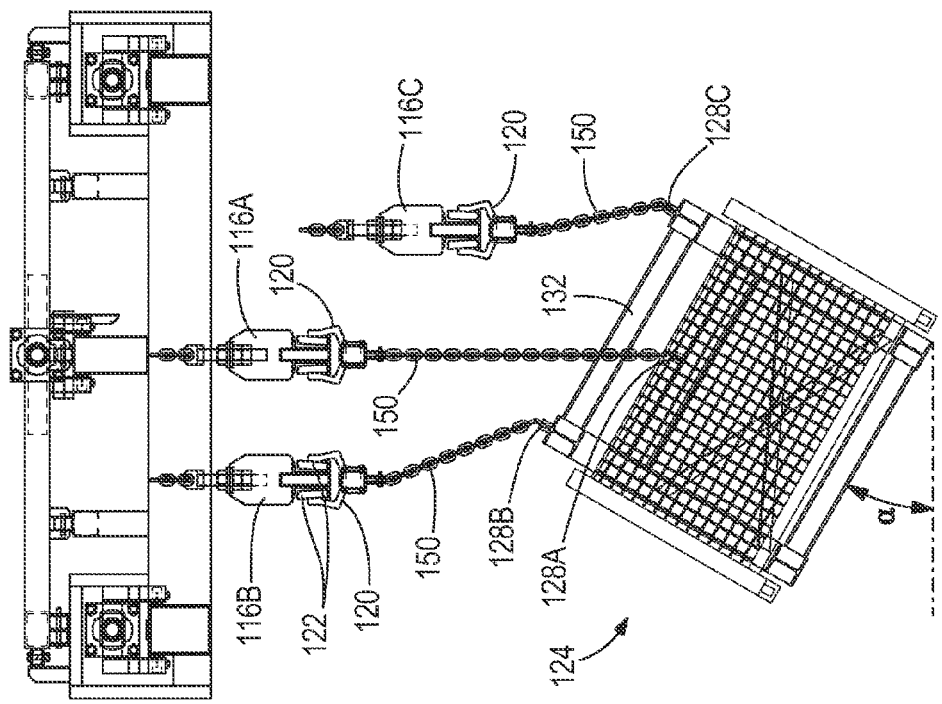
FIG. 8 is an end view of an object suspended from three rails of the coating system and tilted in a first lateral direction.

When positioned at the corresponding coating stations 102, as supported by the rails 116, all of the baskets 124 are configured for multi-axis tilting. In other words, the baskets 124 can not only be tilted multiple directions about a single axis, but can be tilted in one or more directions about multiple different axes (e.g., 2 or 3 different axes). The tilting can promote uniform, complete coating of parts contained within the baskets 124 (or of one or more work pieces directly supported by the push tubes 120, if a basket 124 is not used), and can also facilitate sufficient drainage of liquid after removal from an immersion tank 104. Promoting uniform, complete coating can include allowing air bubbles to escape or move. As shown in FIGS. 8 and 9, viewing along the direction of conveyance, the baskets 124 can be tilted laterally in both directions by manipulation of the rails 116. More specifically, the baskets 124 can be tilted laterally in a first direction by setting the height of one of the side rails 116C to be tower than the height of the center and opposite side rails 116A, 116B (FIG. 8), and the baskets 124 can be tilted laterally in a second direction, opposite the first direction, by setting the height of the other one of the side rails 116B to be lower than the height of the center and opposite side rails 116A, 116C (FIG. 9). In some constructions, the maximum angle of tilt α provided by manipulation of the rails 116 can be greater than 20 degrees from horizontal in either direction, and in some constructions, can be at least 30 degrees from horizontal in either direction. Depending on the number and location of the supports 128 in relation to each other and the center of gravity of the loaded basket 124, the basket 124 may tilt truly lateral about a longitudinal axis (substantially parallel with the direction of conveyance A) as shown in FIGS. 8 and 9, or may tilt laterally about an axis also having a transverse component.

Figure 11:
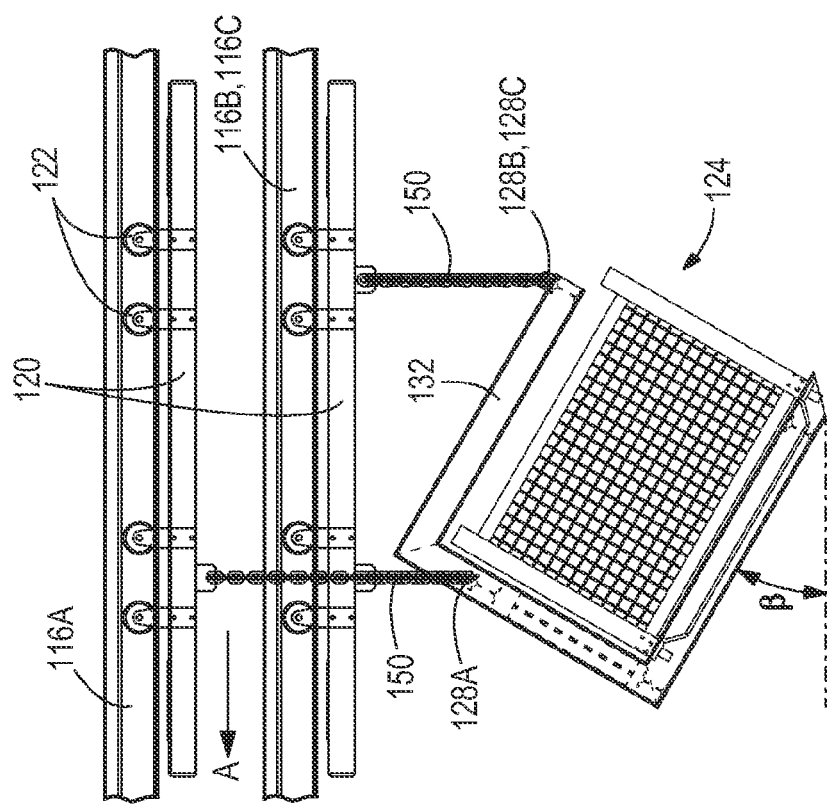
FIG. 11 is a side view of an object suspended from three rails of the coating system and tilted in a second direction about the transverse axis.
Figure 10:
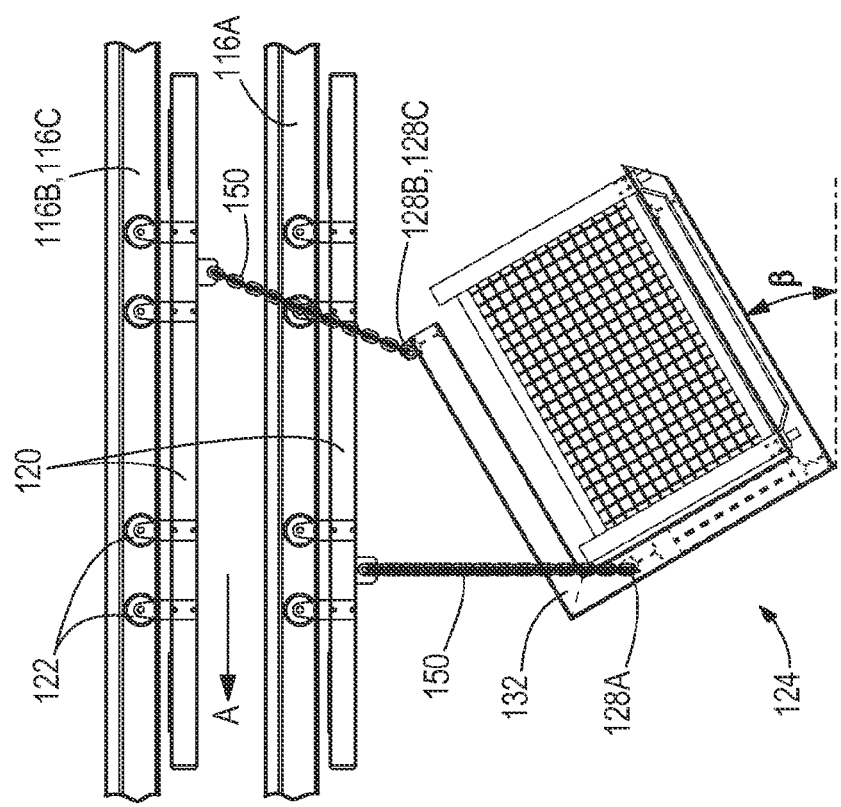
FIG. 10 is a side view of an object suspended from three rails of the coating system and tilted in a first direction about a transverse axis.

As shown in FIGS. 10 and 11, viewing perpendicular to the direction of conveyance, the baskets 124 can be tilted in both forward and aft directions by manipulation of the rails 116. More specifically, the baskets 124 can be tilted in a first fore-aft direction by setting the height of the center rail 116A to be lower than the height of the two side rails 116B, 116C (FIG. 10), and the baskets 124 can be tilted in a second fore-aft direction by setting the height of the center rail 116A to be higher than the height of the two side rails 116B, 116C (FIG. 11). In some constructions, the maximum angle of fore-aft tilt β provided by manipulation of the rails 116 can be greater than 20 degrees from horizontal in either direction, and in some constructions, can be at least 30 degrees from horizontal in either direction. The rails 116 can be vertically movable by individual drives, which can include cranes or winches driven by electric motors, hydraulic drives, or other suitable means. Because the rails 116 extend along all of the coating stations 102 and do not move along the direction of conveyance or laterally, the drive systems for imparting independent vertical movement to the rails 116 can be free from complexities normally associated with drive systems and linkages designed for multi-directional movement of multiple parts. For example, a single, one-axis reversible drive can be provided and configured to raise and lower each of the rails 116. However, even with only basic vertical control of the rails 116, all of the baskets 124 are tillable in the forward direction, the rearward direction, and both lateral directions. Because every basket 124 at a coating station 102 is supported by the same set of rails 116, the tilting of every basket 124 is carried out simultaneously without requiring independent controls or drive systems for each basket 124 or coating station 102. An exemplary step-by-step operation sequence is described with reference to FIGS. 12-27.

A basket 124 of unfinished work pieces is loaded into the finishing system 100 at the loading and unloading station 148 and transported to a first coating station 102 at the next available indexing time. This includes sliding the push bars 120 that support the basket 124 onto the rails 116 of the conveyor system 108. Pushing of the push bars 120 of this most upstream one of the baskets 124 drives all of the downstream baskets 124 to index stations as well, via abutment of all the push bars 120, including indexing the last basket 124 from the last station 102, off the rails 116, and onto the vertical transfer conveyor 140. Once indexing is complete, a sequence of vertical movement of the rails 116 takes place. This sequence of movement can be performed manually by an operator or in a programmed manner using one or more suitable controllers. With regard to programmed movement, the sequence may be stored in and carried out by a controller or computer, and may be re-programmable for a variety of different types of operations or installations. For example, immersion time, draining time, transfer speed, tilt sequence, and/or tilt amount may be varied as desired. Although the following description focuses on only one of the baskets 124 for the purpose of clarity, it will be understood that every basket 124 at every station 102 will have identical motion imparted thereto by manipulation of the rails 116.

Figure 12:
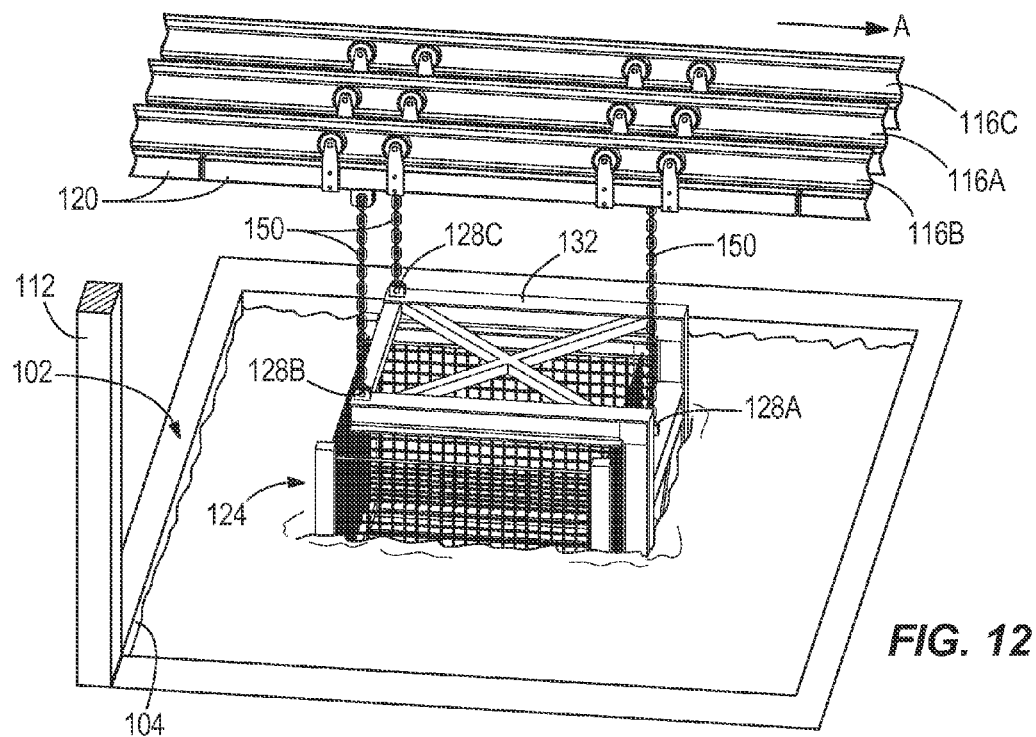
FIG. 12 is a perspective view of an object being immersed into a tank at a coating station of the coating system.
Figure 13:
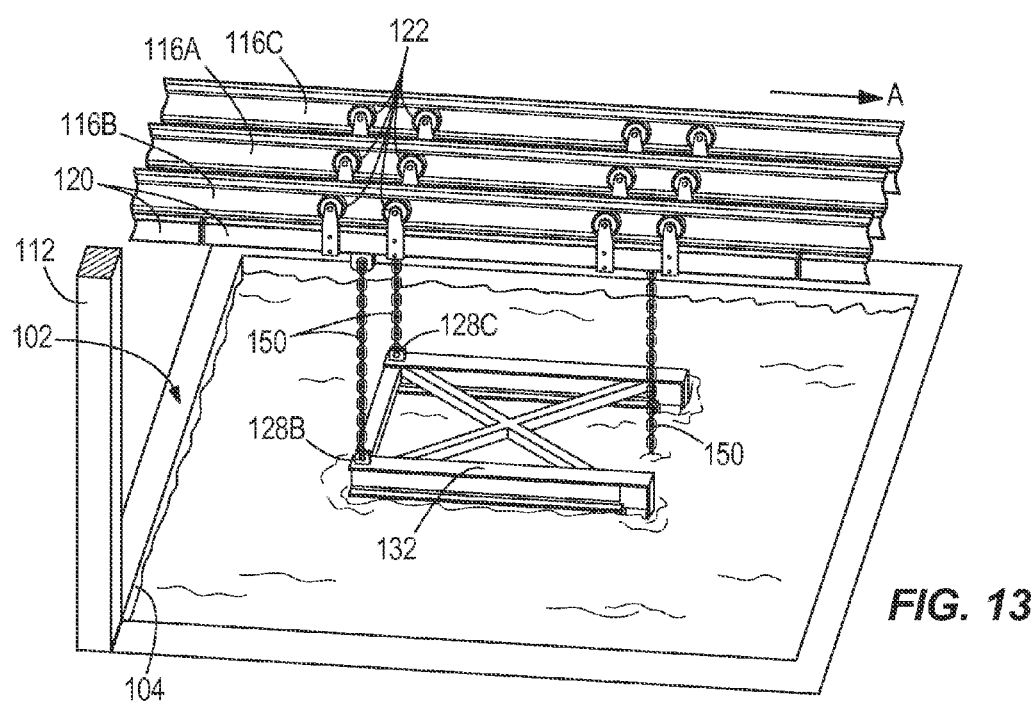
FIG. 13 is a perspective view of the object further immersed into the tank.
Figure 14:
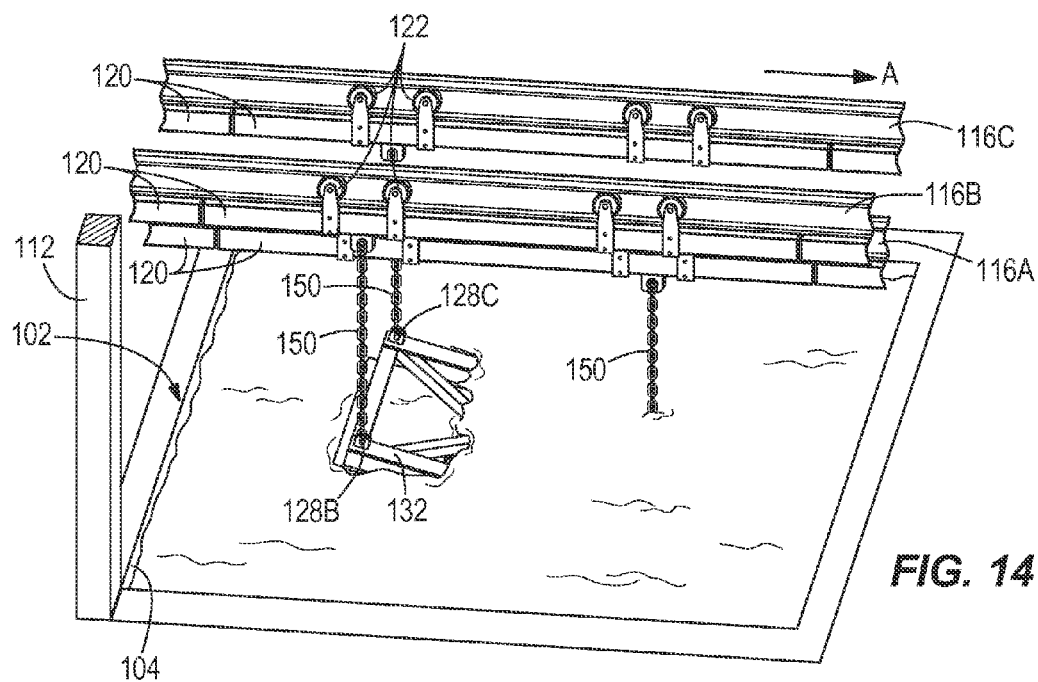
FIG. 14 is a perspective view of the object tilted in a first direction about a transverse axis, while immersed.
Figure 15:
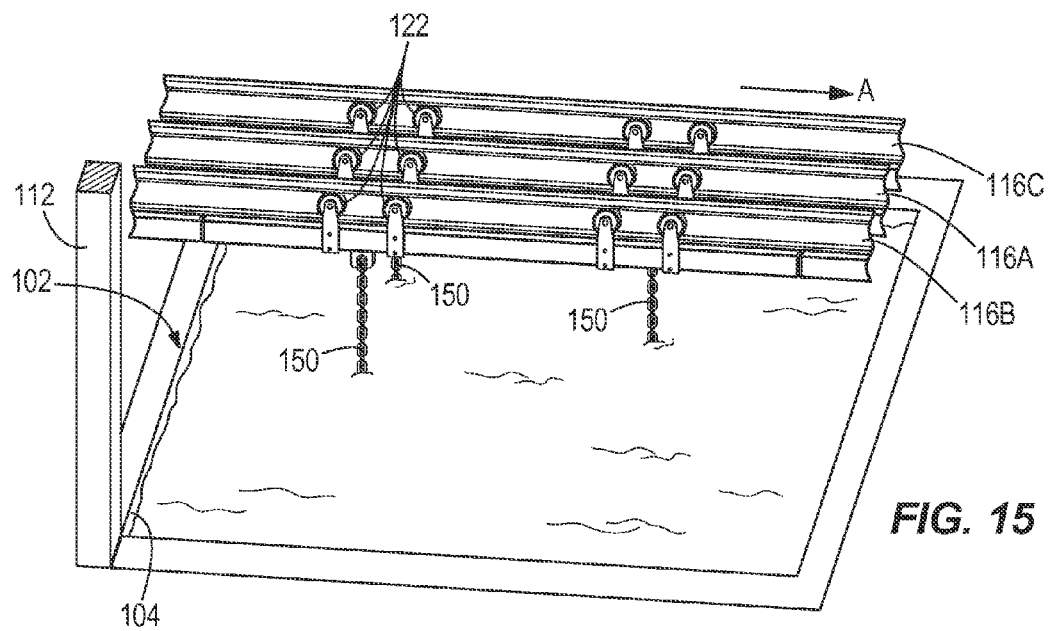
FIG. 15 is a perspective view of the object tilted back to a neutral orientation, while immersed.

With reference to FIGS. 12 and 13, all of the rails 116 are lowered vertically to immerse the basket 124 (and the work pieces therein) into the liquid contained in the tank 104. Because the rails 116 are lowered together in unison, the neutral or upright orientation of the basket 124 is maintained as the basket 124 is immersed. In other embodiments, the baskets 124 can be towered and/or lifted while in any tilted orientation (e.g., laterally and/or in fore-aft directions) by positioning the rails 116 at different elevations with respect to one another as described above. With continued reference to the exemplary sequence illustrated in FIGS. 12-27, once the basket 124 is lowered to completely submerge all the work pieces therein, a first tilting operation is performed (FIG. 14). Although other sequences are possible, the first tilting operation in the illustrated construction is a first fore/aft tilt (e.g., a forward tilt). The forward tilt is enacted by setting a vertical position of the central rail 116A (which is coupled to the front support 128A) to be lower than the two side rails 116B, 116C (which are coupled to the two rear supports 128B, 128C). This can be accomplished by lifting the two side rails 116B, 116C, by lowering the central rail 116A, or by a combination of both. As shown in FIG. 15, the basket 124 can then be returned to the neutral orientation by setting all three rails 116 to a common vertical position.

Figure 16:
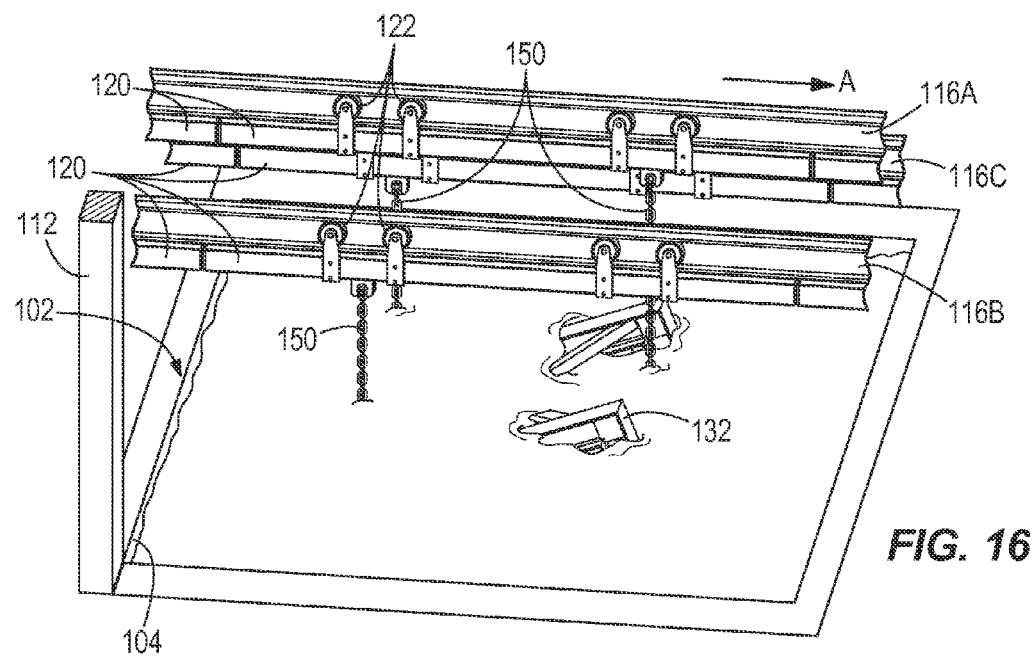
FIG. 16 is a perspective view of the object tilted in a second direction about a transverse axis, white immersed.
Figure 17:
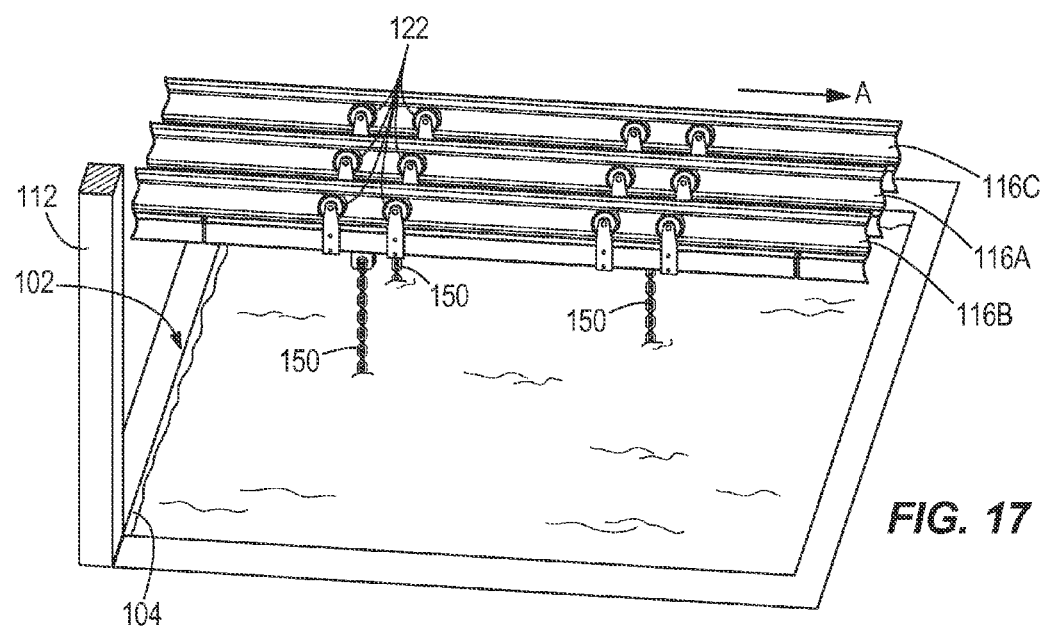
FIG. 17 is a perspective view of the object tilted back to a neutral orientation, while immersed.

With the basket 124 still immersed in the tank 104, a second tilting operation is performed (FIG. 16). Although other sequences are possible, the second tilting operation in the illustrated construction is a second fore/aft tilt (e.g., a rearward tilt). The rearward tilt is enacted by setting a vertical position of the central rail 116A (which is coupled to the front support 128A) to be higher than the two side rails 116B, 116C (which are coupled to the two rear supports 128B, 128C). This can be accomplished by lowering the two side rails 116B, 116C, by raising the central rail 116A, or by a combination of both. As shown in FIG. 17, the basket 124 can then be returned to the neutral orientation by setting all three rails 116 to a common vertical position.

Figure 18:
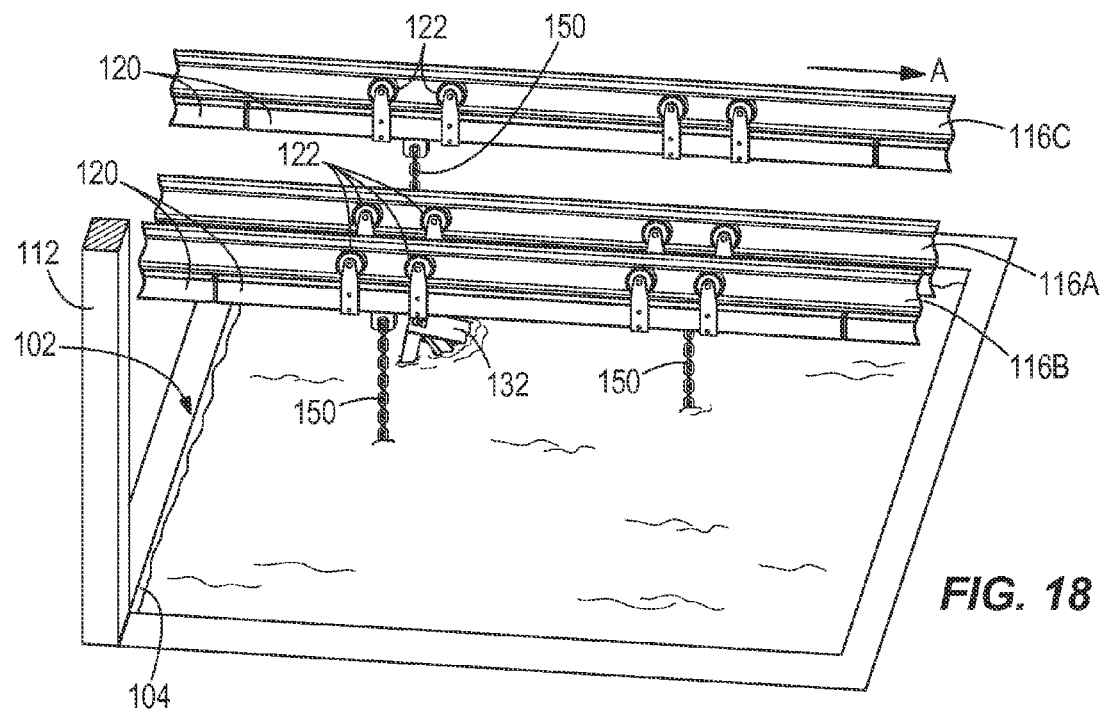
FIG. 18 is a perspective view of the object tilted in a first lateral direction, while immersed.
Figure 19:
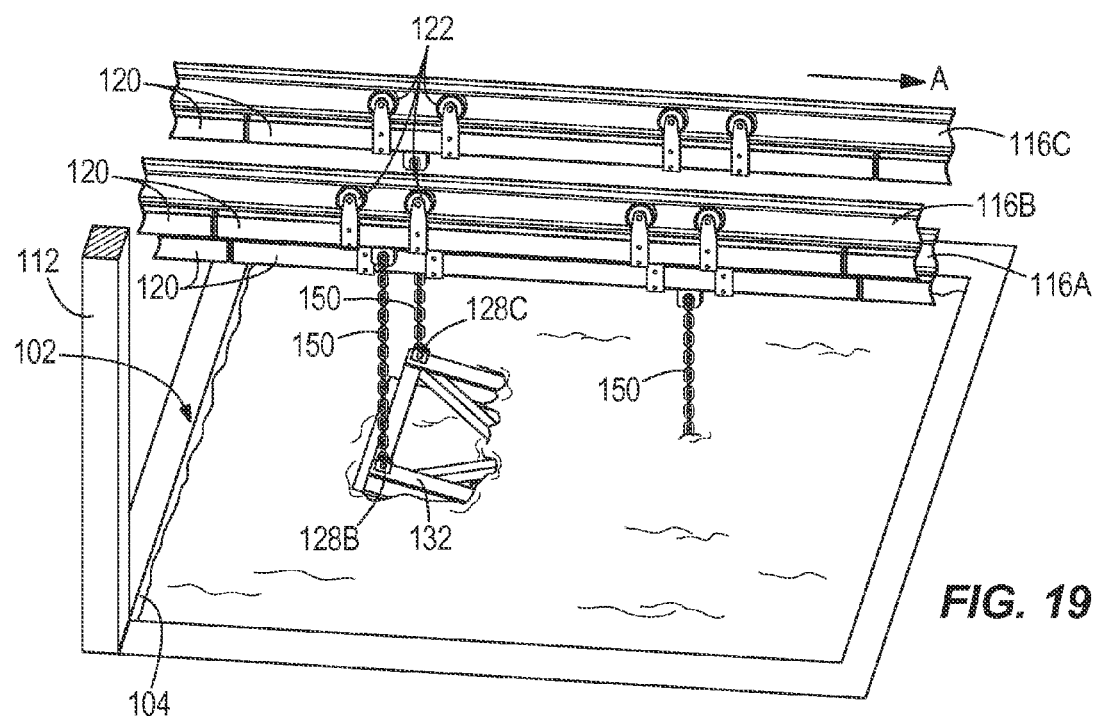
FIG. 19 is a perspective view of the object tilted in the first direction about the transverse axis, while immersed.

With the basket 124 still immersed in the tank 104, a third tilting operation is performed (FIG. 18). Although other sequences are possible, the third tilting operation in the illustrated construction is a first lateral tilt. The first lateral tilt is enacted by setting a vertical position of a first one of the side rails 116C (i.e., the left side rail when viewing in the direction of conveyance A) to be higher than the other two rails 116A (central), 116B (right side). This can be accomplished by lowering the two rails 116A, 116B, by raising the left side rail 116C, or by a combination of both. As shown in FIG. 19, the basket 124 can then be returned to a forward tilted orientation by raising the right side rail 116B to the height of the left side rail 116C and leaving the central rail 116A in its lower position. Alternately, the basket 124 can be returned to the neutral orientation.

Figure 20:
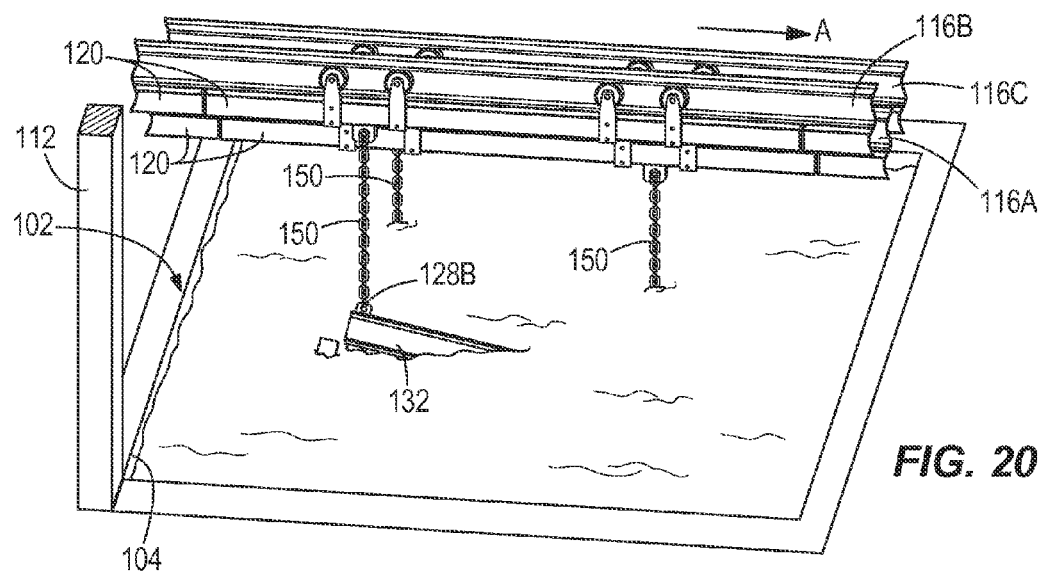
FIG. 20 is a perspective view of the object tilted in a second lateral direction, while immersed.
Figure 21:
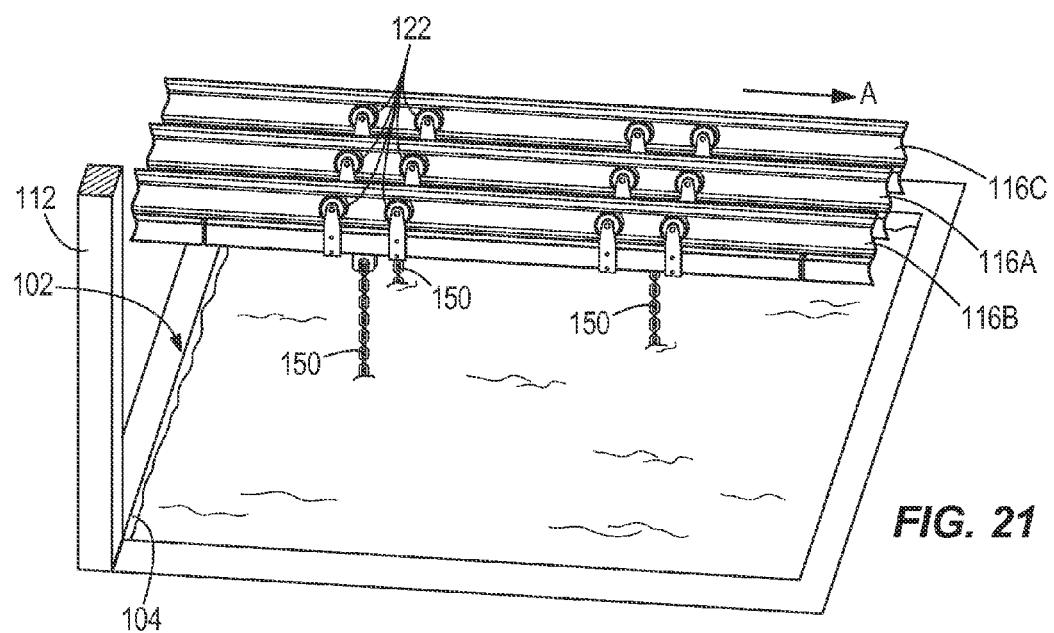
FIG. 21 is a perspective view of the object tilted back to a neutral orientation, while immersed.
Figure 22:
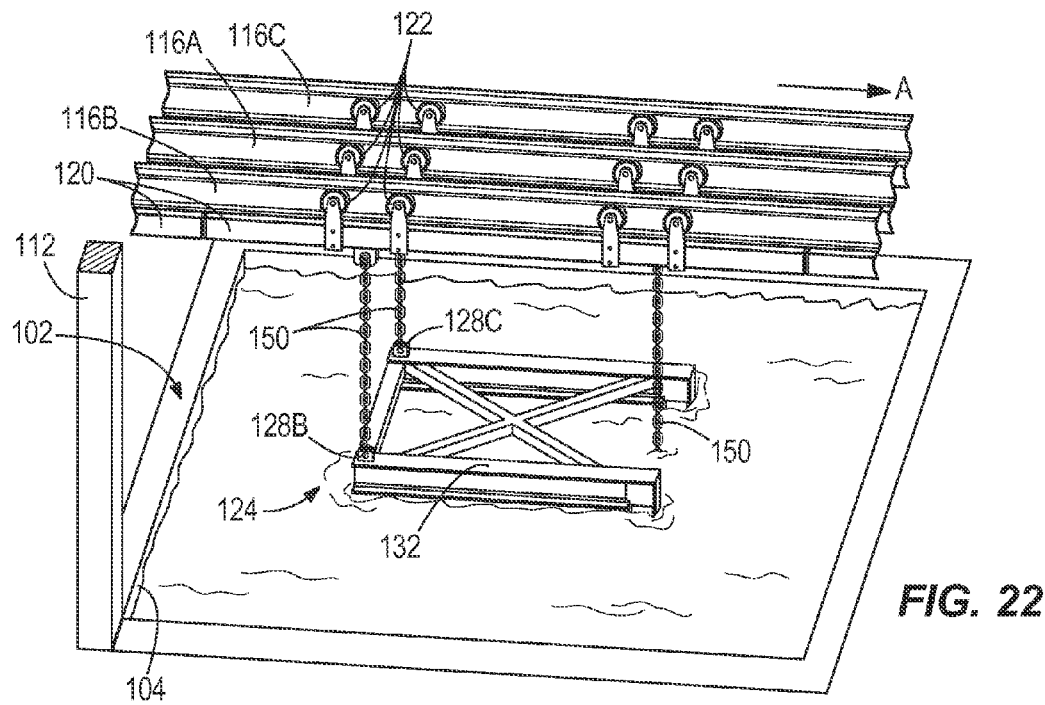
FIG. 22 is a perspective view of the object being raised from the tank of the coating station.
Figure 23:
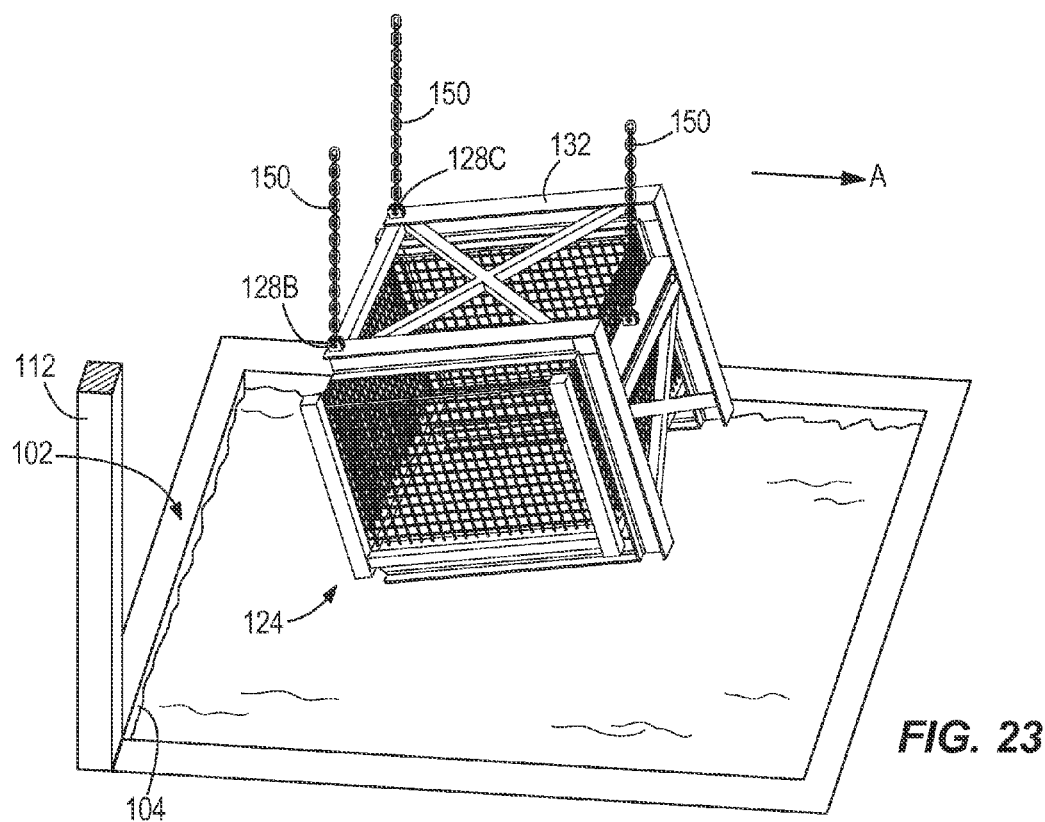
FIG. 23 is a perspective view of the object tilted in a first direction about a transverse axis to drain liquid from the object.
Figure 24:
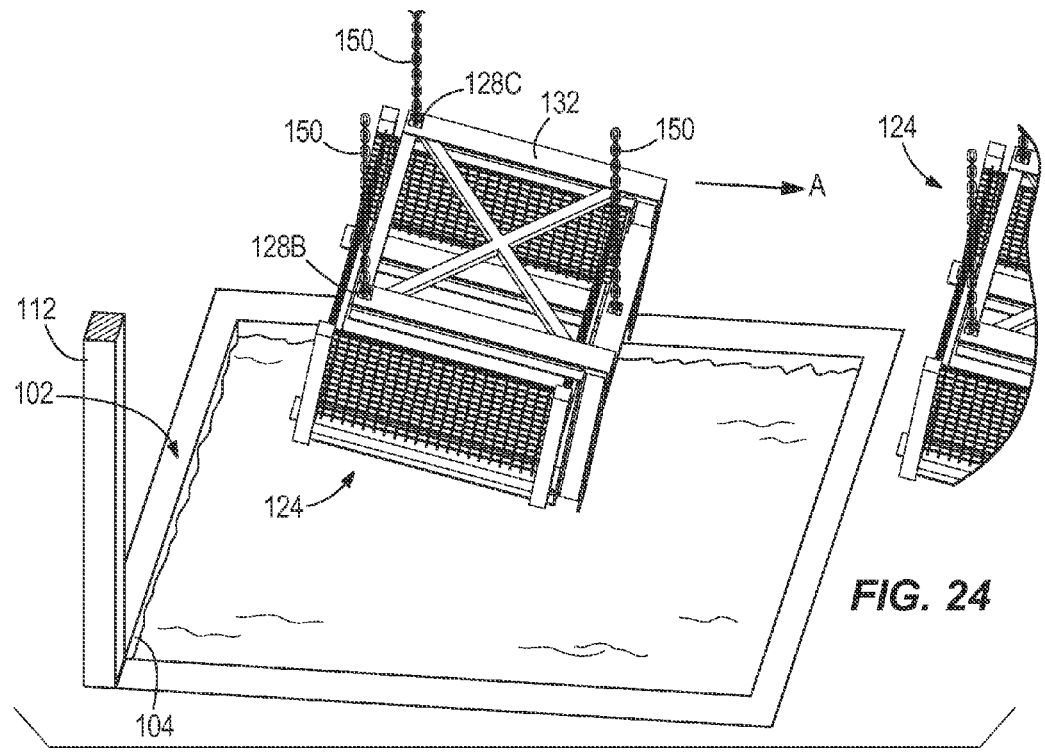
FIG. 24 is a perspective view of the object tilted in a first lateral direction to drain liquid from the object.
Figure 25:
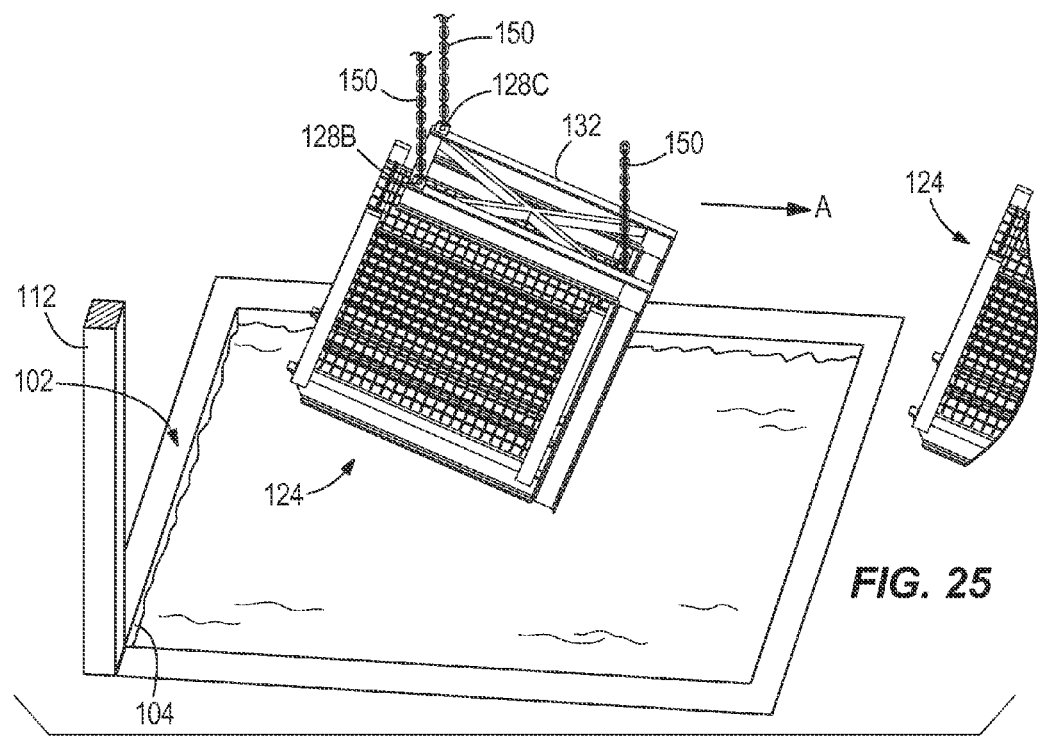
FIG. 25 is a perspective view of the object tilted in a second direction about a transverse axis to drain liquid from the object.
Figure 26:
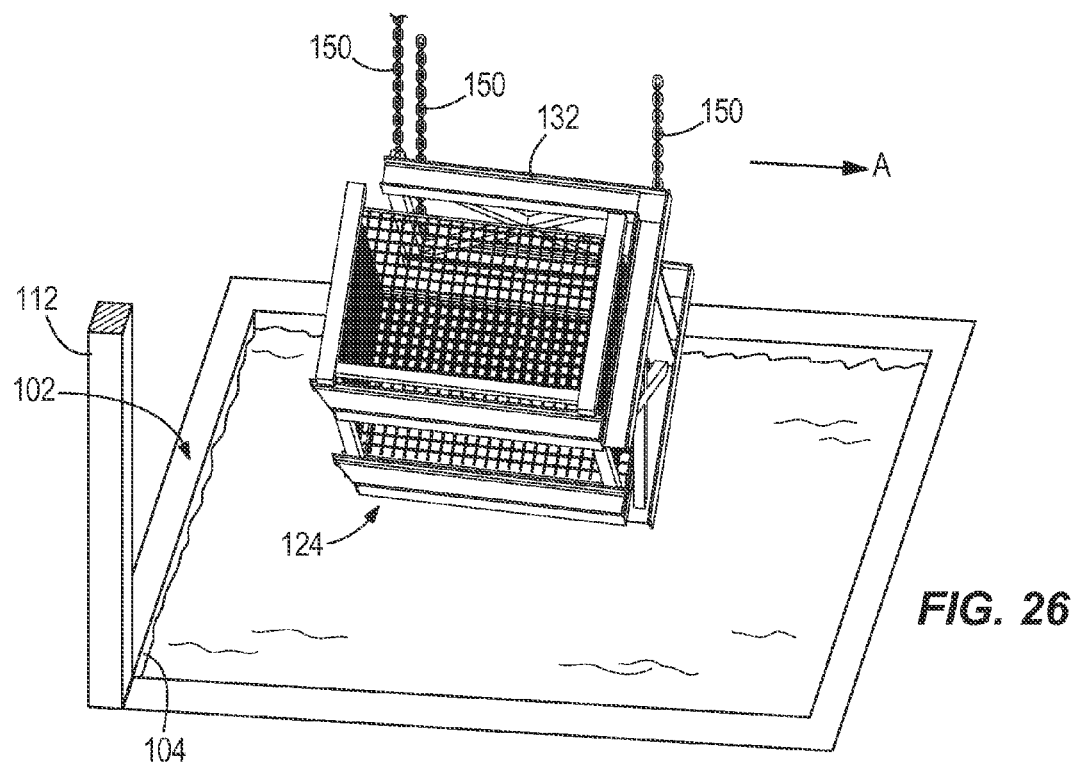
FIG. 26 is a perspective view of the object tilted in a second lateral direction to drain liquid from the object.
Figure 27:
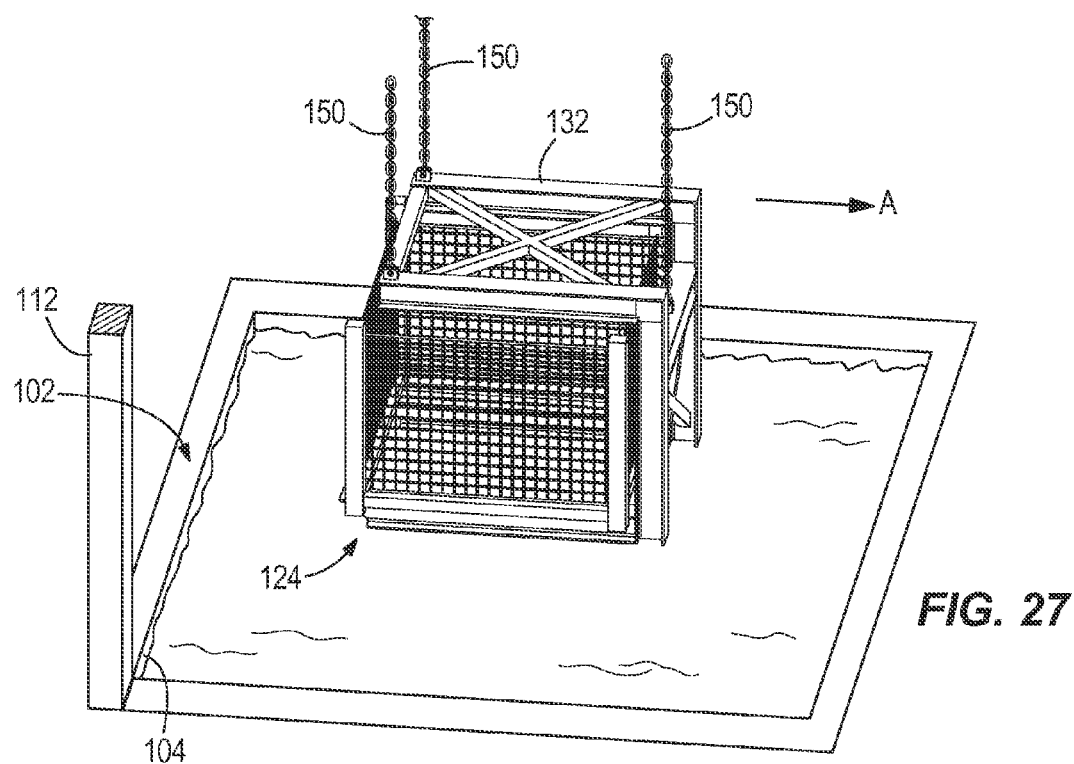
FIG. 27 is a perspective view of the object tilted back to a neutral orientation, above the tank.

With the basket 124 still immersed in the tank 104, a fourth tilting operation is performed (FIG. 20). Although other sequences are possible, the fourth tilting operation in the illustrated construction is a second lateral tilt. The second lateral tilt is enacted by setting a vertical position of a second one of the side rails 116B (i.e., the right side rail when viewing in the direction of conveyance A) to be higher than the other two rails 116A (central), 116C (left side). This can be accomplished by lowering the two rails 116A, 116C, by raising the right side rail 116B, or by a combination of both. As shown in FIG. 21, the basket 124 can then be returned to the neutral orientation by setting all three rails 116 to a common vertical position. In the neutral orientation, the basket 124 is raised out of the tank 104 by raising all of the rails 116 in unison (FIG. 22).

Once lifted out of the liquid of the tank 104, another tilting sequence is performed to promote drainage of liquid that may be trapped in or between work pieces in the basket 124. Although a variety of different tilting sequences can be utilized, the illustrated tilting sequence begins with a first fore/aft tilt (e.g., a rearward tilt, FIG. 23), followed by a first lateral tilt (e.g., a right side tilt, FIG. 24), followed by a second fore/aft tilt (e.g., a forward tilt FIG. 25), and finally a second lateral tilt (e.g., a left side tilt, FIG. 26). Each of the tilting operations for draining is carried out according to vertical rail manipulations as described above with respect to the immersed tilting sequence, except that all the rails 116 are at a height that keeps the basket 124 from being submerged. Then the basket 124 is returned to a neutral orientation (FIG. 27) before being indexed to the next station 102. The sequence is repeated as the basket 124 is processed through each station 102. As the baskets 124 are indexed through the stations 102, baskets 124 that have previously passed through each station 102 are indexed through the oven 136 along the return conveyor 144, before being lowered by the vertical transfer conveyor 146 back to the loading and unloading station 148 for removal from the finishing system 100.

Although described above as including a series of tilting operations, each starting from and returning to a neutral orientation, it should be noted that the tilting operations need not always be carried out in this way, whether in or above the tank 104. For example, in some constructions, the basket 124 is moved through a plurality of tilted positions without interstitial movements to the neutral orientation. The basket 124 may even be moved seamlessly to pitch and roll through a plurality of tilted orientations without stopping. Such action may involve more sophisticated motion control and coordination among the rails 116, but is still possible without introducing more complex hardware than the three vertically-movable rails 116.

Although the illustrated system includes three parallel rails 116 for coupling to three supports 128, another system (not shown) can include any number of additional rails for suspension of each basket 124 at additional desired locations. For example, a set of four parallel rails can be used, each of which is independently movable in a vertical direction to manipulate the baskets 124 for a plurality of tilting operations. In the four-rail embodiment, each basket 124 can be suspended by four fixed-length chains or other members hanging from the corresponding four rails, which extend parallel to one another along the length of all the stations 102. Similar to the three-rail system 100, all the baskets 124 are simultaneously dipped into the plurality of tanks 104 and are tiltable in multiple directions, including a fore/aft direction and a lateral direction. The four-rail system may tilt each basket 124 about two perpendicular axes, including a longitudinal axis parallel to the direction of conveyance A and a transverse axis perpendicular to the direction of conveyance A.

Various features and advantages of the invention are set forth in the following claims.

What is claimed is:

1. A system comprising:
   a plurality of stations positioned along a direction of conveyance;

a set of rails spanning across a length of the plurality of stations and including at least first, second, and third rails; and a plurality of objects supported by and movable along the first, second, and third rails relative to the plurality of stations so that each of the plurality of objects may be positioned at a corresponding one of the stations, wherein each of the plurality of objects has first, second, and third supports coupled to the respective first, second, and third rails, wherein each of the first, second, and third rails is vertically movable independently of the other two of the first, second, and third rails to set respective heights of the first, second, and third supports coupled thereto, and wherein independent vertical movement of selected ones of the first, second, and third rails is configured to set a first configuration in which all of the plurality of objects are tilted in unison about a first set of axes, and to set a second configuration in which all of the plurality of objects are tilted in unison about a second set of axes.

2. The system of claim 1, wherein the plurality of stations includes a plurality of liquid containing immersion tanks, and wherein the plurality of objects includes a plurality of liquid permeable baskets configured to hold one or more parts for coating.

3. The system of claim 2, wherein each of the plurality of liquid permeable baskets includes a carrier on which the first, second, and third supports are provided.

4. The system of claim 3, wherein the first support is centrally located in a lateral direction transverse to the direction of conveyance, and the second and third supports are side supports spaced laterally to opposite sides of the first support.

5. The system of claim 4, wherein the second and third supports are positioned aft of the first support in the direction of conveyance.

6. The system of claim 1, wherein all of the plurality of objects are tilted at least 30 degrees from horizontal in the first configuration and in the second configuration.

7. The system of claim 1, wherein the first rail is centrally located in a lateral direction transverse to the direction of conveyance, and the second and third rails are side rails spaced laterally to opposite sides of the first rail, wherein all of the plurality of objects are tilted in unison in a forward or an aft direction by setting the first rail to be higher or lower than the second and third rails.

8. The system of claim 1, wherein the first rail is centrally located in a lateral direction transverse to the direction of conveyance, and the second and third rails are side rails spaced laterally to opposite sides of the first rail, and wherein all of the plurality of objects are tilted in unison in a first lateral direction by setting the second rail higher than the third rail.

9. The system of claim 8, wherein all of the plurality of objects are tilted in unison in a second lateral direction by setting the third rail higher than the second rail.

10. The system of claim 1, wherein each of the plurality of objects is suspended from a respective set of first, second, and third carriages coupled to the respective first, second, and third rails, and wherein the first, second, and third carriages corresponding to each of the plurality of objects is provided in end-to-end abutting relationship with the first, second, and third carriages corresponding to each adjacent one of the plurality of objects.

11. The system of claim 10, further comprising a transfer station adjacent each end of the system.

12. The system of claim 11, wherein each of the transfer stations is a vertical transfer station, and a downstream one of the vertical transfer stations is configured to receive the first, second, and third carriages from the first, second, and third rails and lift the corresponding object to a position above the first, second, and third rails.

13. The system of claim 12, further comprising an oven at the position above the first, second, and third rails, wherein the downstream vertical transfer station is configured to receive the first, second, and third carriages from the first, second, and third rails and lift the corresponding object to the oven.

14. A method of processing a plurality of objects through a plurality of stations of a system, the method comprising:

providing first, second, and third rails extending along a length of the plurality of stations in a direction of conveyance;

suspending each of the plurality of objects from the first, second, and third rails with individual support members extending from the first, second, and third rails to corresponding first, second, and third supports on each of the plurality of objects;

tilting all of the plurality of objects in unison in a first direction about a first set of axes in response to setting respective heights of the first, second, and third supports by independent vertical movement of one or two of the first, second, and third rails with respect to the other one or two of the first, second, and third rails into a first configuration; and tilting all of the plurality of objects in unison in a first direction about a second set of axes in response to setting respective heights of the first, second, and third supports by independent vertical movement of one or two of the first, second, and third rails with respect to the other one or two of the first, second, and third rails into a second configuration.

15. The method of claim 14, further comprising tilting all of the plurality of objects in unison in a second direction about the first set of axes in response to setting respective heights of the first, second, and third supports by independent vertical movement of one or two of the first, second, and third rails with respect to the other one or two of the first, second, and third rails into a third configuration, and tilting all of the plurality of objects in unison in a second direction about the second set of axes in response to setting respective heights of the first, second, and third supports by independent vertical movement of one or two of the first, second, and third rails with respect to the other one or two of the first, second, and third rails into a fourth configuration.

16. The method of claim 14, further comprising lowering the first, second, and third rails to submerge the plurality of objects into a corresponding plurality of immersion tanks, each containing a liquid associated with a finishing process, wherein both the tilting of the plurality of objects into the first configuration and the tilting of the plurality of objects into the second configuration are carried out with the plurality of objects submerged.

17. The method of claim 16, further comprising raising the first, second, and third rails to lift the plurality of objects out of the corresponding plurality of immersion tanks, and repeating both the tilting of the plurality of objects into the first configuration and the tilting of the plurality of objects into the second configuration with the plurality of objects suspended above the plurality of immersion tanks to drain liquid from the plurality of objects.

18. The method of claim 17, further comprising indexing each of the plurality of objects along the first, second, and third rails to a next-in-line one of the plurality of stations in a direction of conveyance, and indexing one of the plurality of objects from a last-in-line one of the stations vertically.

19. The method of claim 14, wherein all of the plurality of objects are tilted at least 30 degrees from horizontal in the first configuration and in the second configuration.

20. The method of claim 14, wherein the first rail is centrally located in a lateral direction, and the second and third rails are side rails spaced laterally, transverse to the direction of conveyance, to opposite sides of the first rail, wherein tilting all of the plurality of objects in unison in a first direction about a first set of axes includes tilting in a forward direction by setting the first rail lower than the second and third rails, and wherein tilting all of the plurality of objects in unison in a first direction about a second set of axes includes tilting in a lateral direction by setting one of the second rail and the third rail higher than the other one of the second and third rails.

21. The method of claim 14, further comprising maintaining a fixed length of each of the individual support members suspending each of the plurality of objects from the first, second, and third rails during tilting of the plurality of objects in the first direction about the first set of axes and during tilting of the plurality of objects in the first direction about the second set of axes.

22. The method of claim 14, wherein processing the plurality of objects through the plurality of stations includes processing through a plurality of finishing stations to apply a finish or coating.

\* \* \* \* \*